(12) United States Patent
Liao et al.

(10) Patent No.: US 6,348,747 B1
(45) Date of Patent: Feb. 19, 2002

(54) METHOD FOR CONTROLLING AN AUTO-BALANCING SYSTEM OF THE OPTIC DISK IN AN OPTIC DISK DRIVE

(75) Inventors: Cheng-Yao Liao; Ching-Ho Huang; Tzu-Nan Chen; Lih-Hwa Kuo, all of Taipei (TW)

(73) Assignee: Lite-On IT Corporation, Taipei (TW)

( * ) Notice: Subject to any disclaimer, the term of this patent is extended or adjusted under 35 U.S.C. 154(b) by 28 days.

(21) Appl. No.: 09/609,704

(22) Filed: Jul. 3, 2000

(51) Int. Cl.[7] ............................ H02K 7/04; F16F 15/22
(52) U.S. Cl. .................... 310/51; 369/263; 310/68 B; 74/573 R
(58) Field of Search ............................ 310/51; 318/114, 318/128; 369/263, 264; 74/574, 573 F, 573 R

(56) References Cited

U.S. PATENT DOCUMENTS 5,751,508 A * 5/1998 Karidis .................... 360/97.01
6,155,134 A * 12/2000 Ikuta et al. ................ 74/573 R

* cited by examiner

Primary Examiner—Nestor Ramirez
Assistant Examiner—Judson H. Jones
(74) Attorney, Agent, or Firm—Rosenberg, Klein & Lee

(57) ABSTRACT

A method for controlling an auto-balancing system of an optic disk in an optic disk drive is proposed. As the rotary speed of a spindle motor is not faster than a critical speed, a dither signal of high frequency and micro amplitude is added to a command signal for speeding a maximum rotary speed for reducing friction force, and then the balancing mass successfully moves to a position with a reverse phase opposite to an unbalance vector of the optic disk. After the rotary speed of the spindle motor is higher than a critical speed, the dither signal and then speeding the spindle motor is removed and the motor is accelerated to a maximum rotary speed.

6 Claims, 5 Drawing Sheets

AS A ROTARY SPEED OF A SPINDLE MOTOR IS NOT FASTER THAN A CRITICAL SPEED, ADDING A DITHER SIGNAL OF HIGH FREQUENCY AND MICRO AMPLITUDE TO A COMMAND SIGNAL FOR SPEEDING A MAXIMUM ROTARY SPEED FOR REDUCING FRICTION FORCE, AND THEN THE BALANCING MASS SUCCESSFULLY MOVING TO A POSITION WITH A REVERSE PHASE OPPOSITE TO AN UNBALANCE VECTOR OF THE OPTIC DISK.

↓

AFTER THE ROTARY SPEED OF THE SPINDLE MOTOR IS HIGHER THAN A CRITICAL SPEED, REMOVING THE DITHER SIGNAL AND THEN SPEEDING THE SPINDLE MOTOR TO A MAXIMUM ROTARY SPEED.

FIG.3

INSTALLING A MICRO VIBRATION MOTOR TO AN OPTIC MECHANIC DEVICE; AS THE ROTARY SPEED OF THE SPINDLE MOTOR DOES NOT HIGHER THAN A CRITICAL SPEED, ADDING A COMMAND SIGNAL OF HIGH FREQUENCY AND LOW AMPLITUDE TO THE MICRO VIBRATION MOTOR FOR GENERATING AN EXTRA STIMULATING SIGNAL FOR REDUCING THE FRICTION FORCE AND SUCCESSFULLY MOVING THE BALANCING MASS TO A POSITION WITH A REVERSE PHASE OPPSITE TO THE UNBALANCE VECTOR OF THE OPTIC DISK.

→

AFTER THE ROTARY SPEED OF THE SPINDLE MOTOR IS HIGHER THAN A CRITICAL SPEED, TURNING OFF THE OPERATION OF THE MICRO VIBRATION MOTOR AND THEN ACCELERATING THE SPINDLE MOTOR CONTINUOUSLY TO A MAXIMUM ROTARY SPEED.

FIG.4

METHOD FOR CONTROLLING AN AUTO-BALANCING SYSTEM OF THE OPTIC DISK IN AN OPTIC DISK DRIVE

FIELD OF THE INVENTION

The present invention relates to a method for controlling an auto-balancing system of an optic disk on an optic disk drive, and especially to a method by which the effect of friction force to a balancing mass can be reduced to a minimum so as to assure a preferred balance effect.

BACKGROUND OF THE INVENTION

With the progress of optic information recording medium, the accessing speeds for optic disk drives used in the computer peripheral devices are increased in a very rapid ratio. Nowadays, the optic disk drive (CD-ROM) with a spindle motors having a rotary body over 10000 rpm has become a commercial primary products.

When the spindle motor rotates in a higher speed, the eccentric vibration due to unbalance of the optic disk becomes large so as to induce problems of vibration and noises.

In practical applications of optic disk drives, large vibrations will induce instabilities of the reading ability of the head so that the optic disk drive can not read data in a maximum rotary speed. Besides, for the use of an optic disk drive, the noise of an optic disk drive in a high rotary speed will induce some troubles.

Conventionally, in order to reduce the vibration due to the unbalance of the optic disk as the optic disk drive rotates in a high rotary speed, the manufacturer uses three methods for solving this problem, which are (1) directly increasing the weight of a reader for reducing vibration; (2) using a dynamic absorber in dynamics to reduce vibration; and (3) using an auto-balancing system for reducing vibration.

Aforesaid three ways all can be used to reduce the vibration quantity of the optic disk drive. In principle, the auto-balancing system has a preferred effect, since in that a balancing mass is used to reduce the stimulate energy of a vibration.

In current auto-balancing system used by the manufacturer of an optic disk drive, the auto-balancing system is added above (or blow) a spindle motor. The auto-balancing system includes a balancing mass (in general, steel balls of predetermined numbers) and a rotary body (a housing, in general having a round shape) for supporting the balancing mass. By principle of rotor dynamics, when the rotary speed of the spindle motor is higher than a critical speed, the position of the extra added mass will be at a position opposite to the unbalance vector of original optic disk. Thereby, the unbalance of the optic disk can be cancelled and thus, the vibration of the optic disk drive is reduced.

However, in fact, some confinement in manufacturing, such as real roundness, concentricity, coarseness and other factors induce the effect in application is not as good as that prediction from theory. In these factor, the friction force relates to a surface coarseness has a direct effect to the result of the balancing mass moving from an initial position to a ideal position.

Therefore, it is appreciated that the prior art auto-balancing system in an optic disk drive has some defect which is eagerly to be improved, and thus a novel method for controlling an auto-balancing system of the optic disk in an optic disk drive is required for solving these problems.

SUMMARY OF THE INVENTION

Accordingly, the primary object of the present invention is to provide method for controlling an auto-balancing system of the optic disk in an optic disk drive. Thereby, the vibration due to an unbalance of the optic disk during operation of an optic disk drive is reduced by an effective and steady method. As a result, the objects of reading data with high and accurate speed and operation smoothly are achieved.

In order to achieve aforesaid object, the present invention provides a method for controlling an auto-balancing system of an optic disk in an optic disk drive. In order to reduce the friction force of the balancing mass, as the rotary speed of a spindle motor is not faster than a critical speed, a dither signal is added to a command signal for speeding a maximum rotary speed. Then the balancing mass successfully moves to a position with a reverse phase opposite to an unbalance vector of the optic disk. After the rotary speed of the spindle motor is higher than a critical speed, the dither signal and then speeding the spindle motor is removed and the motor is accelerated to a maximum rotary speed.

The various objects and advantages of the present invention will be more readily understood from the following detailed description when reading in conjunction with the appended drawing.

BRIEF DESCRIPTION OF THE DRAWINGS

FIG. 3 is a flow diagram of the control way of the present invention.

FIG. 4 is a flow diagram showing the control way in another embodiment of the present invention.

DETAILED DESCRIPTION OF THE PREFERRED EMBODIMENTS

The present invention will be described in the following with the appended figures, wherein these figures are only used as a reference for assisting the description of the present invention, not to confine the present invention.

Figure 1:
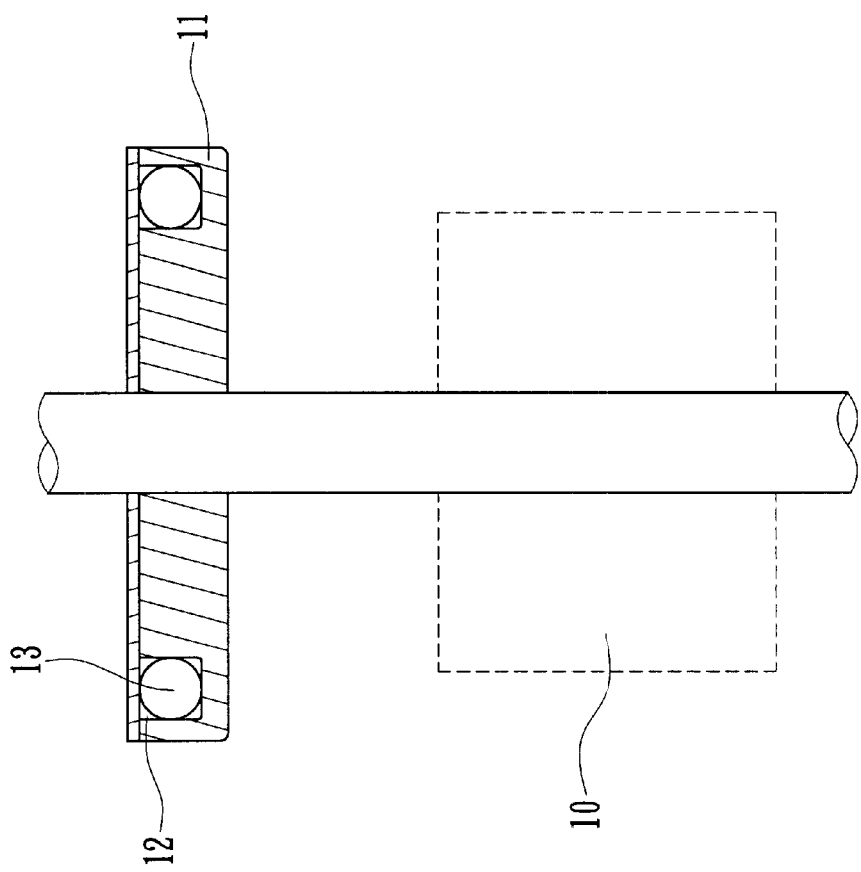
FIG. 1 is a schematic view showing that the present invention is embodied in a single track auto-balancing system.

The present invention provide a method for controlling an auto-balancing system of the optic disk in an optic disk drive, and especially to a method for applying an external force to the balancing mass in an auto-balancing system, which is suitable to a single track or a multiple track auto-balancing system. As shown in FIG. 1, the general used auto-balancing system is installed above (or below) a spindle motor 10. The structure of the auto-balancing system includes a rotary body 11 (housing) rotated synchronously with the spindle motor 10. A round track 12 around the center of rotary axis of the rotary body 11 is installed on the rotary body 11. The track 12 is a round trench. At least one steel ball (balancing mass) 13 is installed in the track 12 for forming a single track auto-balancing system. A plurality of tracks 12 are installed in the rotary body 11 (see FIG. 2) for forming a multiple track auto-balancing system.

In the present invention, an outer force is used to reduce the friction force. Two embodiments are described in the following.

Embodiment 1

Figure 2:
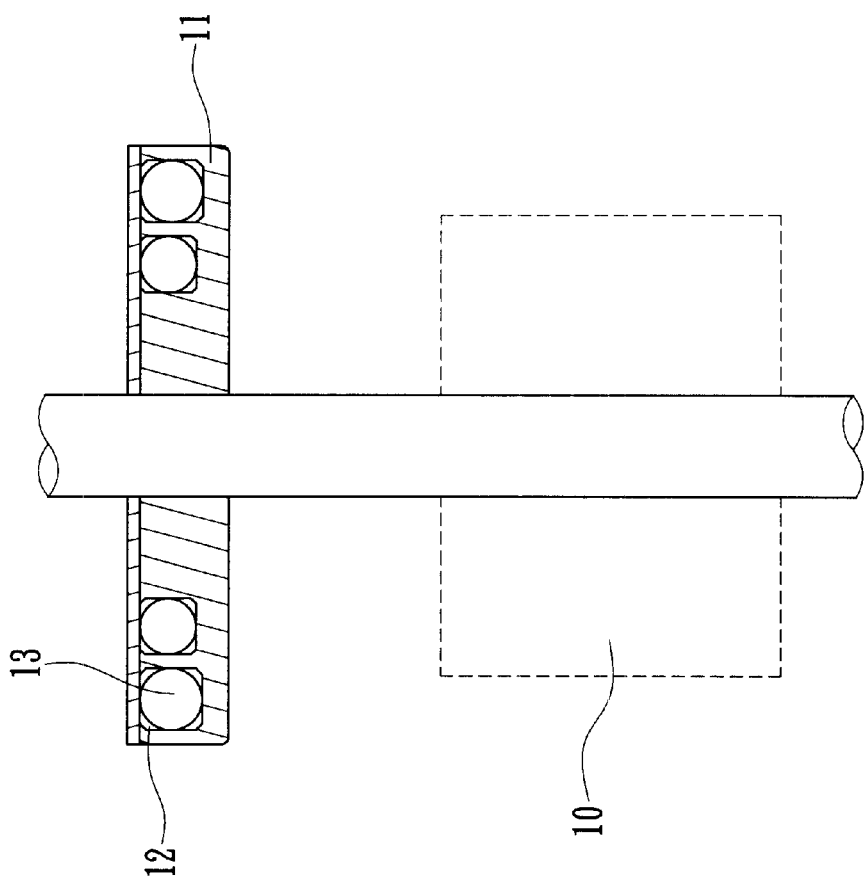
FIG. 2 is a statue variable showing that the present invention is embodied in a multiple track auto-balancing system.

In this embodiment, an electric way is used, and the control way includes the following steps (with reference to FIGS. 1, 2 and 3)

(a) When the rotary speed of the spindle motor 10 is not faster than a critical speed, a command signal for speeding the maximum rotary speed 10 is added with a dither signal of high frequency and micro amplitude, then the balancing mass (steel ball 13) may be in a vibration state by this dither signal of high frequency and micro amplitude so as to reduce the friction force, and successfully move to a position with a reverse phase opposite to the unbalance vector of the optic disk.

(b) After the rotary speed of the spindle motor is higher than the critical speed, the dither signal is removed and then the spindle motor 10 is speeded to a maximum rotary speed.

Embodiment 2

Figure 5:
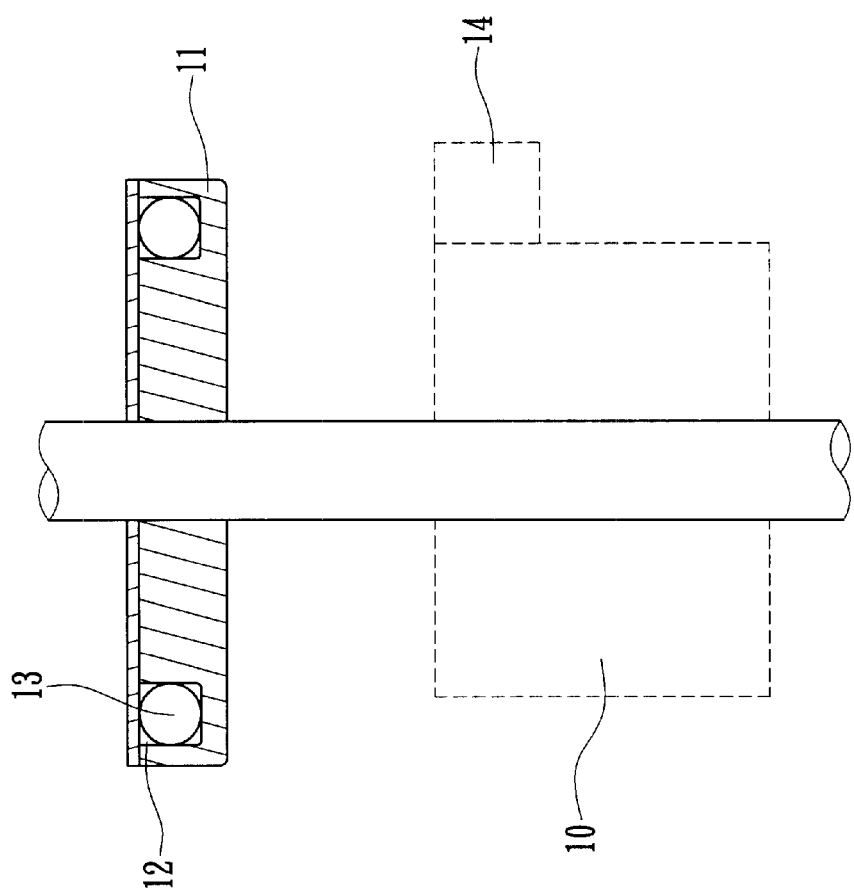
FIG. 5 is a schematic view showing the control means in another embodiment of the present invention.

In this embodiment, a mechanical way is used and the control ways includes the following steps (Referring to FIGS. 4 and 5):

(a) A micro vibration motor 14 is added a proper place of an optic mechanic device. As the rotary speed of the spindle motor 10 is not higher than a critical speed, a command signal of high frequency and low amplitude is added to the micro vibration motor 14 for generating an extra stimulating signal. Then the balancing mass (steel ball 13) will be at a vibration state of high frequency and micro amplitude by this stimulus force so as to reduce the friction force and successfully move to a position with a reverse phase opposite to the unbalance vector of the optic disk.

(b) After the rotary speed of the spindle motor 10 is higher than a critical speed, the operation of the micro vibration motor 14 is turned off, and then the spindle motor 10 is accelerated continuously to a maximum rotary speed.

The present invention provides a novel control way for being used in a single track or multiple track auto-balancing system so that the vibration due to an unbalance of the optic disk during operation of an optic disk drive is reduced by an effective and steady method. As a result, the objects of reading data with high and accurate speed and operation smoothly are achieved.

Therefore, by the present invention, the defects in the prior art optic disk drive auto-balancing system in practical application due to confinement in manufacturing so that the real balance function is not as that predicted from the theory is improved by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for controlling an auto-balancing system of an optic disk in an optic disk drive, comprising the steps of:

(a) as a rotary speed of a spindle motor is not faster than a critical speed, adding a dither signal of high frequency and micro amplitude to a command signal for speeding a maximum rotary speed for reducing friction force, and then the balancing mass successfully moving to a position with a reverse phase opposite to an unbalance vector of the optic disk.

(b) after the rotary speed of the spindle motor is higher than a critical speed, removing the dither signal and then speeding the spindle motor to a maximum rotary speed.

2. The method for controlling an auto-balancing system of an optic disk in an optic disk drive as claimed in claim 1, wherein the auto-balancing system is a single track or a multiple track auto-balancing system.

3. The method for controlling an auto-balancing system of an optic disk in an optic disk drive as claimed in claim 1, wherein the auto-balancing system is installed above or below the spindle motor and includes an rotary body which is a housing and rotated synchronously with the spindle motor; at least one round track around a center of a rotary axis of the rotary body is installed on the rotary body, and at least one steel ball is disposed in the track to be used as balancing mass.

4. A method for controlling an auto-balancing system of an optic disk in an optic disk drive, comprising the steps of:

(a) installing a micro vibration motor to an optic mechanic device; as the rotary speed of the spindle motor is not higher than a critical speed, adding a command signal of high frequency and low amplitude to the micro vibration motor for generating an extra stimulating signal for reducing the friction force and successfully moving the balancing mass to a position with a reverse phase opposite to the unbalance vector of the optic disk.

(b) after the rotary speed of the spindle motor is higher than a critical speed, turning off the operation of the micro vibration motor and then accelerating the spindle motor continuously to a maximum rotary speed.

5. The method for controlling an auto-balancing system of an optic disk in an optic disk drive as claimed in claim 4, wherein the auto-balancing system is a single track or a multiple track auto-balancing system.

6. The method for controlling an auto-balancing system of an optic disk in an optic disk drive as claimed in claim 4, wherein the auto-balancing system is installed above or below the spindle motor and includes an rotary body which is a housing and rotated synchronously with the spindle motor; at least one round track around a center of a rotary axis of the rotary body is installed on the rotary body, and at least one steel ball is disposed in the track to be used as balancing mass.

* * * * *